United States Patent Office 3,142,999
Patented Aug. 4, 1964

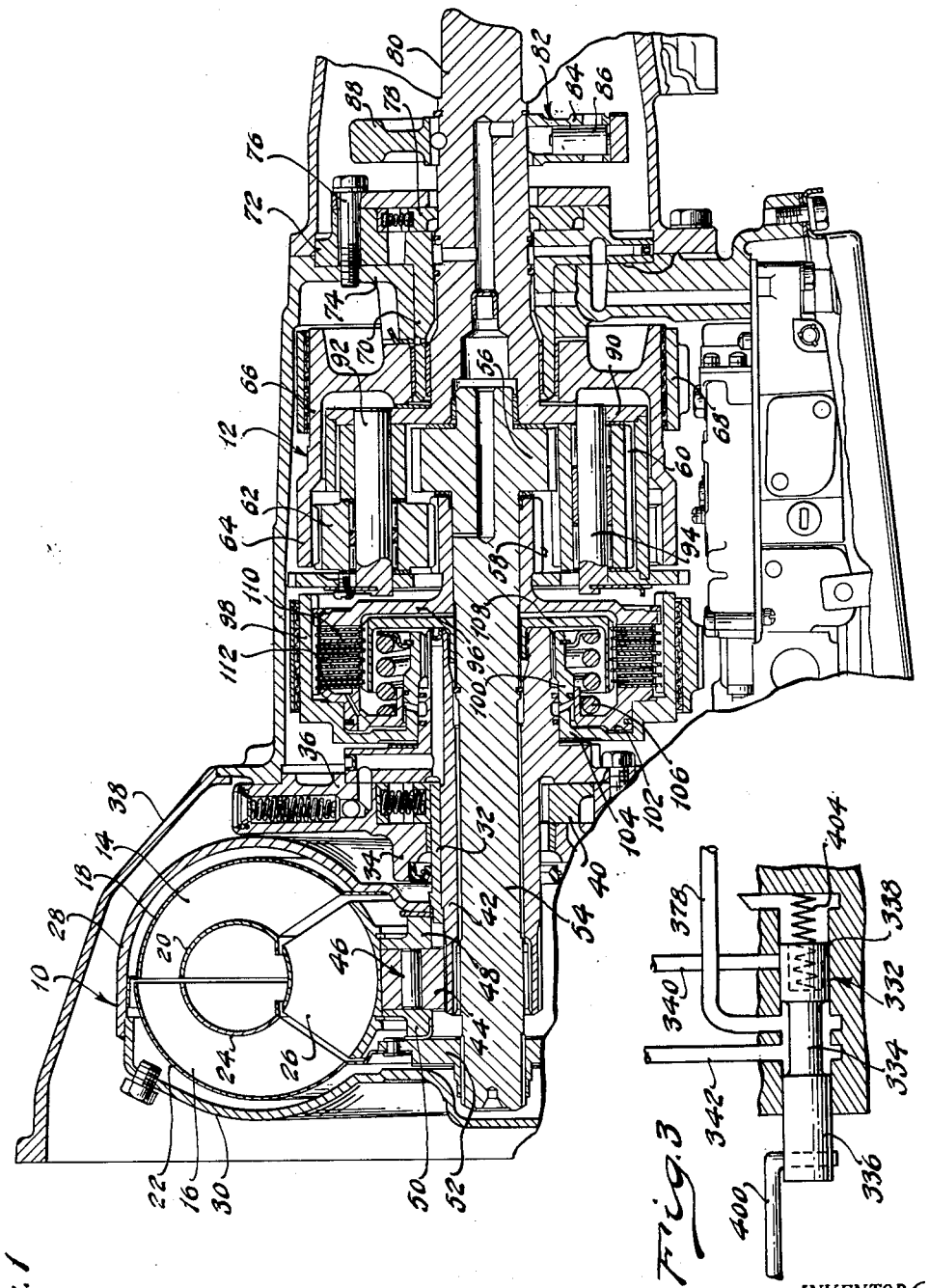

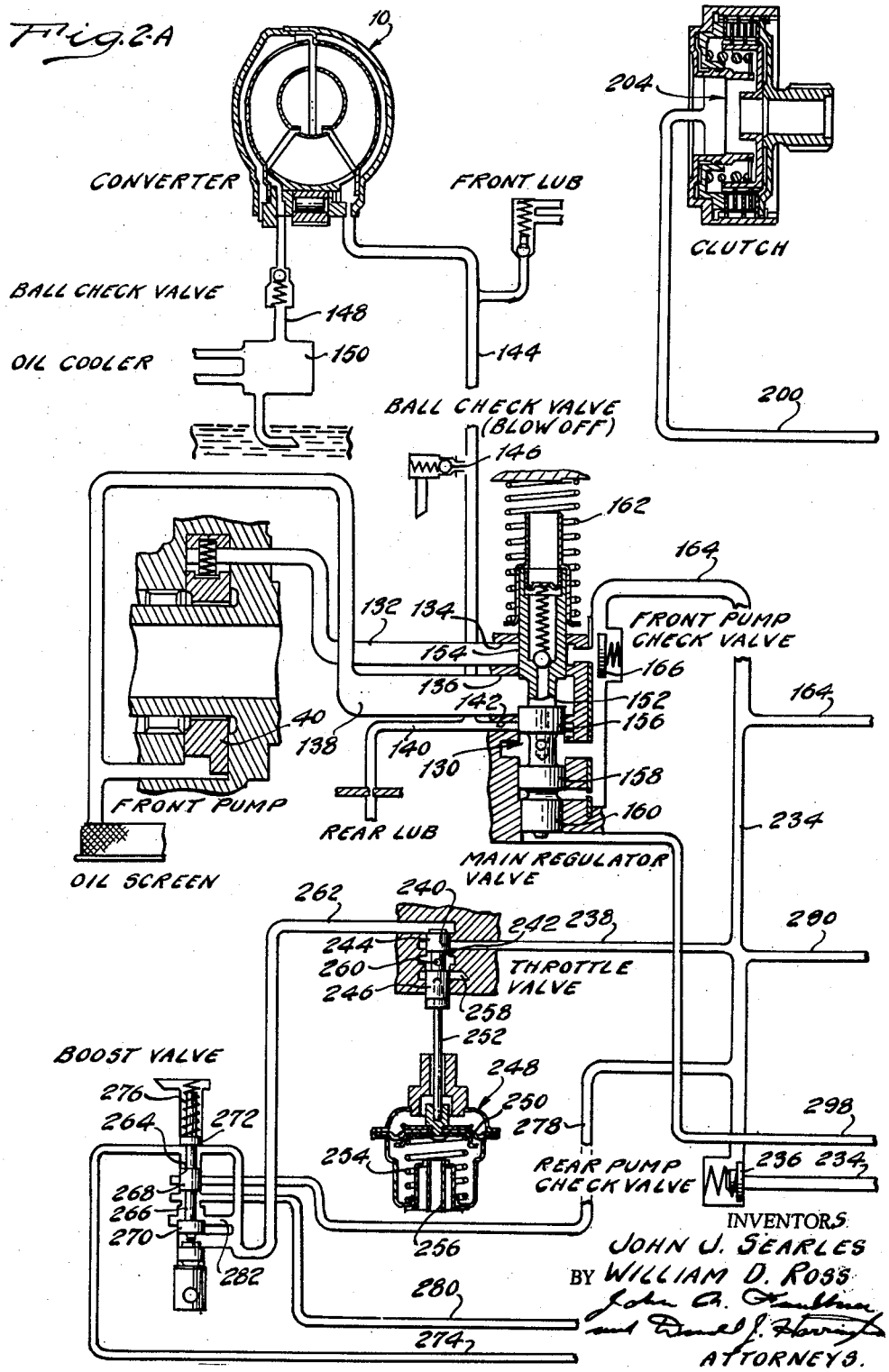

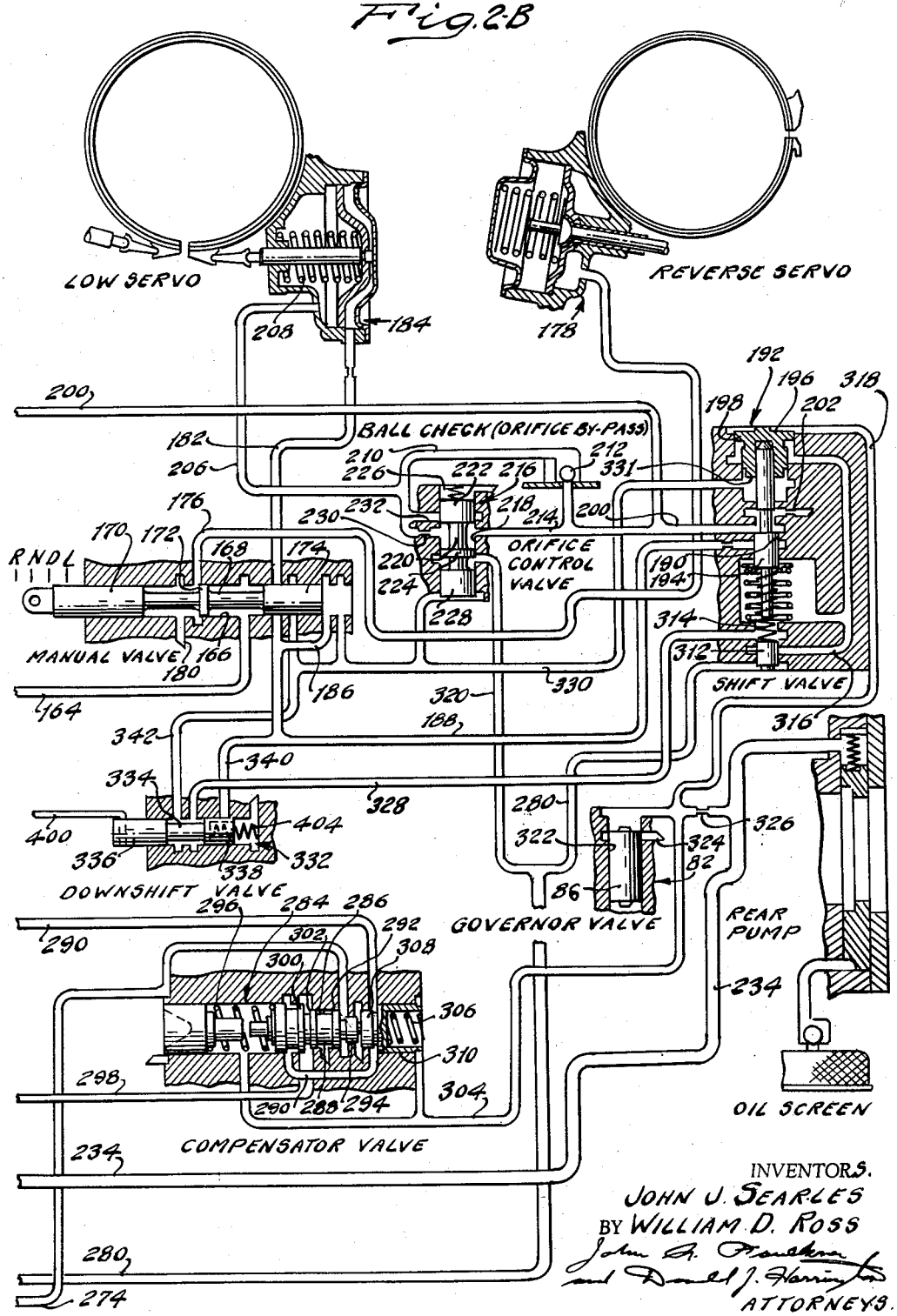

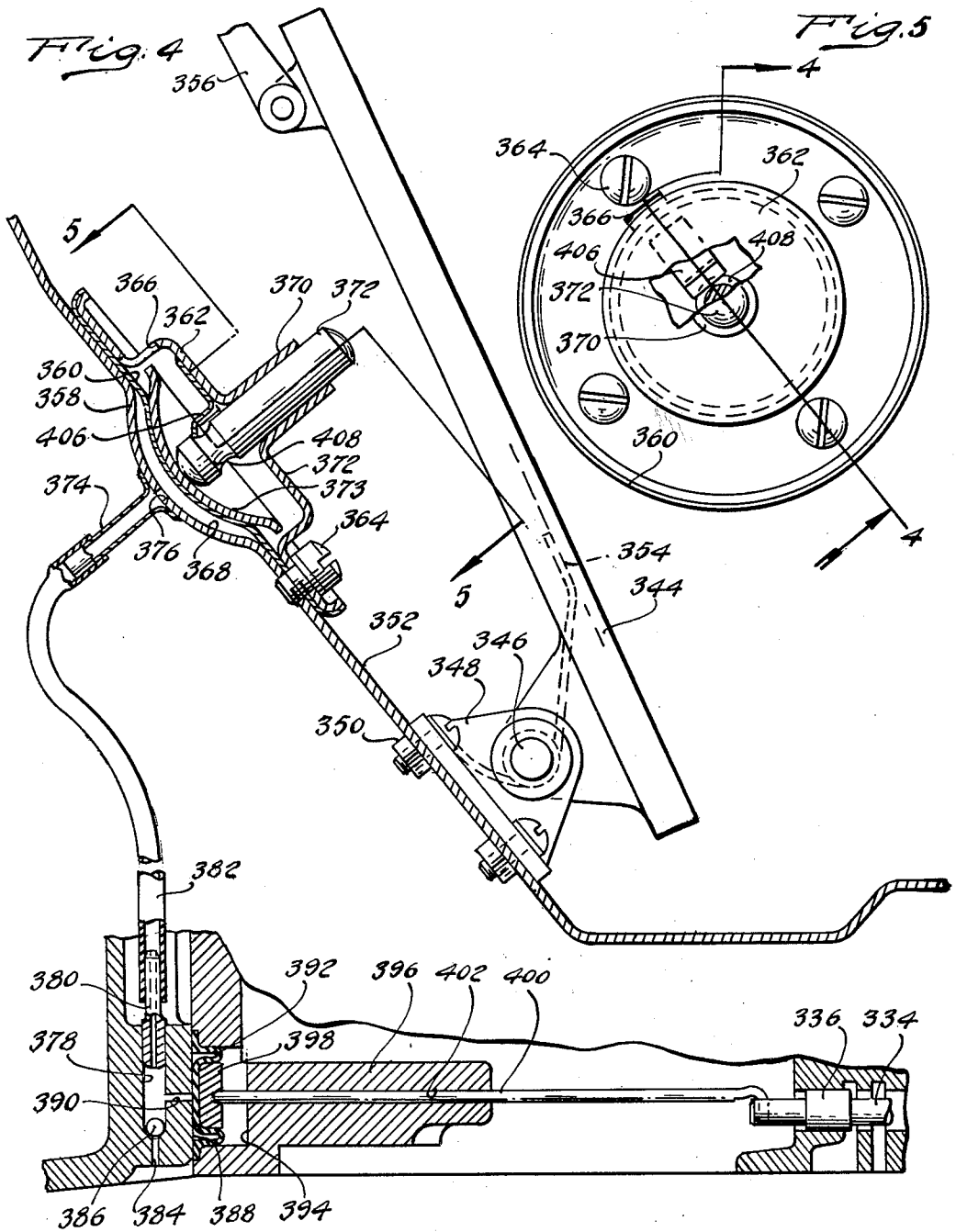

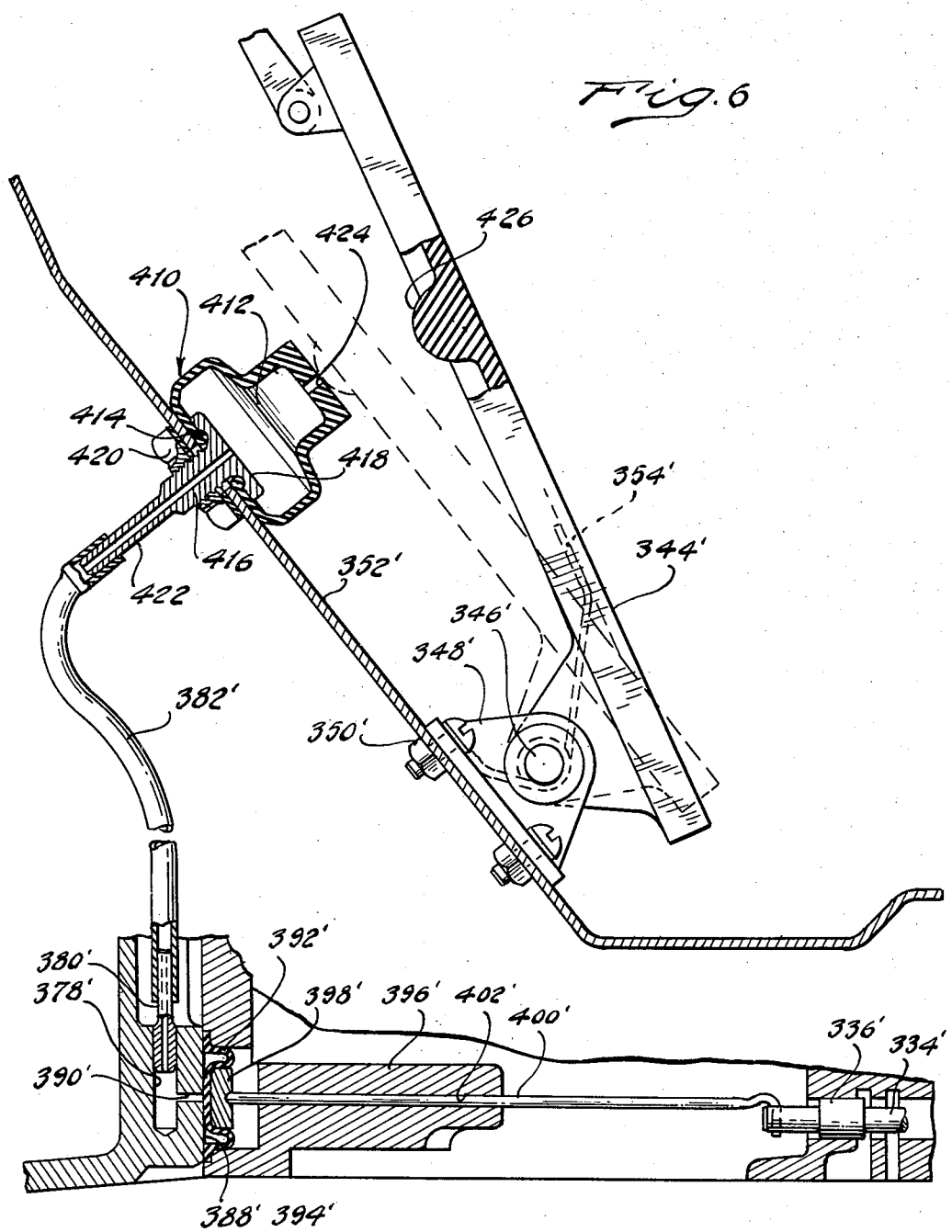

3,142,999
DOWNSHIFT CONTROL MECHANISM
John J. Searles, Garden City, and William D. Ross, Dearborn, Mich., assignors to Ford Motor Company, Dearborn, Mich., a corporation of Delaware
Filed Sept. 22, 1961, Ser. No. 140,113
1 Claim. (Cl. 74—472)

Our invention relates generally to remotely operated control mechanisms, and more particularly to a fluid pressure control valve system that forms a portion of an automatic control circuit.

The improvement of our invention is adapted particularly to be used with automatic power transmission mechanisms for automotive vehicles. Such mechanisms comprise torque transmitting gear elements capable of delivering power from the vehicle engine to a power output shaft with several torque multiplication driving ratios. The relative motion of the gear elements of the mechanism is controlled by friction clutches or brakes, and a gear ratio change during operation can be accomplished by appropriately energizing or deenergizing the clutches or brakes. The clutches and brakes are actuated by means of fluid pressure operated servos. Fluid pressure is distributed selectively to the servos by a control valve mechanism situated in a valve circuit that includes also an engine driven pump or an output shaft driven pump and the aforementioned servos.

The valves of the control system are sensitive to changes in engine torque demand and vehicle speed and are actuated in response to pressure signals that are proportional in magnitude to these variables. The transmission mechanism thus is conditioned for an optimum speed ratio under any given driving condition.

Under certain extreme driving conditions and during emergencies it is desirable to obtain a down shift from any relatively high speed ratio to a lower speed ratio in order to accelerate the vehicle. This is done by providing a so-called downshift valve that is related functionally to the automatically controlled valves and overrules the influence of the pressure signals to accomplish a downshift regardless of the vehicle speed and engine torque. The downshift valve is under the control of the vehicle operator.

Such a downshift valve normally requires a mechanical linkage connection between the vehicle engine throttle control and the downshift valve. The linkage can be adjusted so that the downshift valve will be moved to a so-called downshift position when the vehicle engine carburetor is moved to a wide open position. At any engine throttle setting less than the wide open throttle setting the downshift valve will remain inoperative and the transmission will respond normally to variations in engine torque demand and vehicle speed.

In our improved mechanism we have eliminated such a mechanical connection between the vehicle engine throttle control and the downshift valve. Our improved mechanism includes actuator and follower servos that are connected in a closed hydrostatic circuit. The actuator servo can be operated by the engine throttle linkage mechanism when the latter assumes a wide open throttle position. When so actuated, the hydrostatic pressure developed in the actuator servo is distributed to the follower servo through a hydrostatic pressure conduit. The follower servo responds to changes in hydrostatic pressure in the actuator servo to adjust appropriately the downshift valve. The hydrostatic pressure conduit can be placed in any convenient location and will not interfere with the other vehicle components. It also eliminates the need for providing an adjustment of the type normally required in transmission downshift valve system.

For the purpose of more particularly describing our invention in an appropriate structural environment, reference will be made to the accompanying drawings, wherein:

FIGURE 1 shows a cross sectional assembly view of a multiple speed power transmission mechanism of the automotive type;

FIGURE 2, a combination of FIGURES 2A and 2B, shows a control valve circuit in schematic form that is capable of regulating the action of the clutches and brakes of the assembly of FIGURE 1 during a speed ratio change;

FIGURE 3 is a subassembly view showing the downshift valve of FIGURE 2;

FIGURE 4 is a cross sectional view showing the downshift valve actuator mechanism;

FIGURE 5 is a partial assembly view of a portion of the mechanism of FIGURE 4 as viewed along section line 5—5 of FIGURE 4; and FIGURE 6 is a view similar to FIGURE 4 showing a modified form of the downshift actuator mechanism.

Our downshift valve mechanism can be applied to any of a variety of multiple speed power transmission mechanisms. The mechanism of FIGURES 1 and 2 is one of several that may be employed. For this reason it will be described only briefly to provide a better understanding of the mode of operation of our improvement.

Referring first to FIGURE 1, a hydrokinetic torque converter is generally indicated by reference numeral 10 and a planetary gear system is shown at 12. The torque converter includes an engine driven pump 14 and a cooperating turbine 16. The pump 14 is defined in part by toroidal inner and outer shrouds 18 and 20, and the turbine 16 is defined in part by corresponding shrouds 22 and 24 respectively. Blade elements are situated between the shrouds of the pump and turbine to define radial flow passages. The pump and the turbine cooperate to form a toroidal fluid flow path for the hydrodynamic fluid that they contain.

The bladed reactor member 26 is situated in a toroidal fluid flow circuit of the converter between the entrance section of the pump 14 and the exit section of the turbine 16. Reactor 26 functions to change the direction of the toroidal fluid flow before it enters the inlet section of the pump. Torque multiplication is obtained in this fashion.

The pump 14 includes a pump shell 28 that is connected to a drive plate 30. An engine crankshaft, not shown, may be drivably connected to the drive plate 30 in any suitable fashion, such as by bolts. The radially inward portion of the shell 28 is connected to a sleeve shaft 32 that in turn is journaled on a bearing support 34. A housing separator wall 36 carries the support 34, the latter being secured in turn to a cast transmission housing 38 that includes a main portion for enclosing the gear system and a converter bell housing portion.

The wall 36 is formed with a pump cavity for accommodating an engine driven pump 40 that forms a part of the control circuit subsequently to be described. The pump 40 includes a rotor that is keyed or otherwise secured to sleeve shaft 32 and is driven thereby.

A relatively stationary stator shaft 42 is received within the sleeve shaft 32 and supports an inner race 44 for an overrunning roller clutch assembly generally identified by reference numeral 46. This clutch assembly carries the aforementioned bladed stator 26 and is disposed within the hub of the stator. It accommodates rotation of the stator in one direction during coupling operation of the converter unit and forms a one-way brake between the stator and the stationary shaft 42 during operation of the converter in the torque multiplication range. Spacers 48 and 50 are located on each side of the clutch 46 for appropriately positioning the stator with respect to the pump and the turbine. The spacer 48 engages the hub portion of the shell 28 and the spacer 50 engages the hub 52 of the turbine 16. A turbine shaft 54 is splined or otherwise secured to the hub 52 and extends longitudinally within the stationary sleeve shaft 42.

The gear unit 12 includes a pair of sun gears 56 and a relatively small diameter sun gear 58. Gear 56 engages compound planet pinions 60 that in turn engage planet pinions 62. Pinions 62 engage ring gear 64, the latter being carried by a brake drum 66. A friction brake band 68 encircles brake drum 66 and is adapted to anchor the same when it is energized. The means for accomplishing this braking action will be explained with reference to FIGURE 2.

Drum 66 is journaled rotatably on a relatively stationary sleeve 70 extending from an enclosure member 72 for the housing 38, the latter being secured to a housing wall 74 by means of bolts 76.

Member 72 is provided with a pump housing that accommodates a pump shown at 78. This pump includes a roller that is drivably connected to power output shaft 80. Pump 78 forms a portion of the control valve circuit of FIGURE 2 as will subsequently be explained.

A fluid pressure governor is shown at 82 and includes a housing 84 having a valve bore therein within which is positioned slidably a valve element 86. The housing 84 includes also a counterweight 88 situated 180° out of position with respect to the valve element 86. The governor 82 also comprises a part of the control valve circuit of FIGURE 2. The power output shaft 80 is connected drivably to a carrier 90 for the planetary gear unit 12. The carrier 90 includes pinion shafts 92 and 94 that rotatably journal the aforementioned pinions 62 and 60, respectively.

Sun gear 58 is connected to clutch member 96 that in turn is keyed or splined to brake drum 98. Brake drum 98 is journaled for rotation upon an extension 100 of the reactor shaft 42. Drum 98 defines also an annular cylinder 102 within which is positioned slidably an annular piston 104. Cylinder 102 and piston 104 cooperate to define a fluid pressure cavity. A clutch piston return spring is shown at 106 and is anchored on the clutch drum. It normally urges the piston 104 in a left-hand direction as viewed in FIGURE 1.

Splined to turbine shaft 54 is a clutch member 108 that is splined externally to accommodate internally splined discs 110 of a multiple disc clutch assembly. Externally splined discs 112 are splined to an internally splined portion of the brake drum 98. It thus is apparent that when pressure is applied to piston 104, sun gears 58 and 56 will become locked together by means of the friction clutch discs 110 or 112. This establishes a 1:1 driving ratio between the turbine shaft 54 and the power output shaft 80.

The control system used for automatically controlling the operation of the clutch and brake servos of the transmission mechanism will be described briefly with reference to FIGURES 2a, 2b and 3. Referring first to FIGURE 2a, the engine driven front pump 40 is in fluid communication with a main regulator valve shown generally at 130. Fluid pressure is distributed from the high pressure side of the pump 40 through a passage 132 to a fluid pressure inlet port 134 for the regulator valve 130. A low pressure port 136 for the regulator valve communicates with the low pressure side of the pump 40 through a return passage 138, and lubrication oil passage 140 communicates with a port 142 for the regulator valve. A converter pressure supply passage 144 communicates with the aforementioned passage 140. A regulated pressure is maintained in passage 144 by a ball type regulator valve 146. Fluid under pressure is supplied to the converter 10 continuously during operation. Fluid is returned from the converter 10 through a return flow passage 148 that communicates with an oil cooler 150 that in turn discharges fluid to the transmission sump.

The regulator valve 130 includes a valve spool 152 having spaced valve lands 154, 156, 158 and 160. The valve lands 158 and 160 are formed with different diameters so that a differential area is defined thereby.

Valve spool 152 is slidably positioned in a cooperating valve chamber and is urged in a downward direction as viewed in FIGURE 2a by a valve spring 162.

The force of the valve spring 162 is opposed by fluid pressure force acting on the differential diameter between valve lands 158 and 160. The balanced forces produced by the pressure acting on the differential area and the spring force adjustably position the valve spool 152 to control communication between passages 132 and 138 and between passages 142 and 138. As the pressure in passage 132 increases, valve spool 152 is moved against the opposing force of spring 162 until the pressure is relieved by valve land 154 as it establishes communication between passages 132 and 136. At a time prior to the relief of passage 132, passage 140 is uncovered by valve land 156 to establish communication between the high pressure side of the pump 40 and passage 140.

Port 134 communicates with passage 164 through a one-way check valve 166. Passage 164 communicates also with the space between valve lands 156 and 158 and with the differential area between valve lands 158 and 160.

Passage 164 communicates with a manual valve chamber 166 within which is positioned slidably a manual valve spool 168. This valve spool includes three valve lands 170, 172 and 174. Passage 176 extends from valve chamber 166 to the reverse servo generally identified by reference character 178. In the position shown, passage 176 communicates with an exhaust port 180, but when the valve spool 168 is moved in a left-hand direction as viewed in FIGURE 2a, communication is established between passage 164 and passage 176.

A low speed servo supply passage 182 connects passage 166 and a low speed brake servo shown generally at 184. When manual valve 168 is in the neutral position as shown in FIGURE 2a, passage 182 is blocked so that communication between passage 182 and passage 164 is interrupted. When the manual valve 168 is moved in a right-hand direction to the "D" position, communication is established between passage 182 and passage 164. In the position of valve spool 168 that is shown in FIGURE 2a, passage 182 is exhausted through branch passage 186.

Passage 182 communicates with passage 188 that extends to a shift valve chamber 190 for a 1–2 shift valve generally identified by reference character 192. This valve chamber 190 includes a valve land 194 and a relatively large valve land 196, the latter preferably being formed separately from the valve land 194. This land 196 is received over a reduced diameter portion that defines a smaller diameter land 198.

A passage 200 communicates with valve chamber 190 and communication between passage 188 and passage 200 is controlled by the valve land 194. When the shift valve spool assumes the position shown in FIGURE 2b, communication is interrupted between passages 188 and 200 and passage 200 is exhausted through an exhaust port 202 by reason of the communication between passage 200 and exhaust port 202 established by the annular space between valve lands 198 and 194.

Passage 200 extends to a high speed clutch servo generally shown at 204 for the aforementioned front clutch assembly. Passage 200 communicates also with a passage 206 that extends to the release side of the aforementioned brake servo 184. The passage 182 communicates with the apply side of the servo 184 as indicated. During operation of the engine throttle at relatively advanced settings, however, changes in throttle position do not correspond to changes in the magnitude of the pressure in passage 262. The boost valve mechanism therefore is designed so that passage 278 will be uncovered by valve land 268 at more advanced engine throttle settings thus causing communication to be established between passage 278 and passage 280. This is done when the valve spool 266 is moved upwardly. Prior to the time it is moved, however, passage 280 is in fluid communication with passage 262 through branch passage 282. After it is moved, this branch passage 282 is blocked and the magnitude of the pressure in passage 280 is augmented by reason of the communication established between passage 280 and line pressure passage 278.

A compensator valve mechanism is shown generally by reference character 284. The compensator valve includes a compensator valve chamber 286 within which is positioned a multiple land valve spool 288. Line pressure is distributed from passage 234 to the valve chamber 286 through passage 290. Throttle pressure in passage 274 is distributed to a differential area defined by valve lands 292 and 294. Valve spool 288 is biased in a right-hand direction by valve spring 296.

It will be apparent from examination of the compensator valve construction that the control pressure made available to the compensator valve through passage 290 is modulated to produce a modified pressure in passage 298 that can be referred to as a compensator pressure. This compensator pressure acts upon a differential area defined by valve lands 300 and 302.

Governor pressure from a governor valve mechanism subsequently to be described is distributed to the left-hand end of the valve chamber 286 and acts upon the valve spool 288 to bias the same in a right-hand direction. This governor pressure is distributed through governor pressure passage 304. This same pressure acts upon a governor pressure plug 306 that is mounted at one end of the compensator valve spool 288. Valve plunger 306 is biased in a right-hand direction by line pressure that acts upon a differential area defined by lands 308 and 310. At lower vehicle speeds, line pressure overcomes the opposing influence of governor pressure acting upon the plunger 306 so that the plunger is maintained out of engagement with the valve spool 288. Thus, the governor pressure acting on the left-hand side of valve spool 288 will augment the spring force of spring 296. Thus, the magnitude of the compensator pressure in passage 298 is increased as the vehicle speed increases for any given engine throttle setting.

Compensator pressure in passage 298 is distributed to the lower end of valve land 160 of the main regulator valve. This causes a modification of the regulated circuit pressure level. Thus, as the vehicle speed increases for any given engine throttle setting, the regulated line pressure will tend to decrease. Conversely, a decrease in vehicle speed will result in an increase in the regulated line pressure.

It is desirable to establish a lower limit below which the line pressure should not fall. This limit normally is that pressure required to prevent slippage of the clutch and brake elements of the mechanism when the mechanism is distributing torque to the driven shaft. It is thus desirable to cause the compensator valve to become insensitive to changes in vehicle speed after a predetermined vehicle speed is obtained. This is done by calibrating suitably the valve plunger 306. When the predetermined vehicle speed is obtained, the governor pressure force acting on the plunger 306 is sufficient to overcome the opposing force of the line pressure in passage 290. This causes the plunger 306 to engage directly the valve element 288. The governor pressure force distributed to valve element 288 then is opposed and balanced by corresponding counter pressure forces acting on the plunger 306 so that the net result of the pressure forces is zero. The compensator valve mechanism then is sensitive only to changes in engine throttle setting.

Boost valve output pressure is distributed through passage 280 to the lower end of the 1–2 shift valve assembly 192. It acts upon a throttle boost valve pressure limiter valve 312. This valve is biased in a downward direction as viewed in FIGURE 2b by valve spring 314 situated between the shift valve spool and the valve element 312.

When passage 280 is pressurized, valve element 312 will move in an upward direction thus establishing communication between passage 280 and passage 316. It will be recognized, however, that the magnitude of the pressure in passage 316 is less than the pressure in passage 280, the amount of the difference in these pressures being determined by the calibration of spring 314. The reduced pressure in passage 316 acts upon the lower end of valve land 194 and the lower end of valve land 196 thus establishes an upward force on the valve assembly. Governor pressure acts upon the other end of valve land 196 and is distributed to the 1–2 shift valve assembly through governor pressure passage 318. The 1–2 shift valve thus operates in response to the differential forces produced by the reduced throttle pressure and the governor pressure.

At relatively low vehicle speeds the shift valve assembly will assume the position shown in FIGURE 2b. This being the case, pressure is distributed to the apply side of a low speed servo, and the front clutch and the release side of the low speed servo are both exhausted through port 202. As the vehicle speed increases for any given engine throttle setting, the shift valve assembly will move in a downward direction thus blocking exhaust port 202 and establishing communication between passage 188 and passage 200. This causes pressure to be distributed to the front clutch and to the release side of the low speed servo. An upshift from low speed ratio to the higher speed ratio thus is accomplished.

Throttle pressure is distributed also to the lower end of the orifice control valve spool 220 through passage 320. This causes valve spool 220 to assume an upward position whenever the transmission mechanism is conditioned for torque delivery. An automatic downshift thus can be accomplished readily since flow restricting orifice 230 is bypassed under these conditions. On the other hand, when a downshift occurs under zero throttle conditions, the lower end of valve spool 220 is not pressurized and the orifice control valve spool assumes the position shown. This introduces the orifice 230 into the passage 214 thus cushioning a zero throttle downshift.

Governor pressure is distributed to the other end of the 1–2 shift valve assembly through passage 318 as previously indicated. This governor pressure is produced by the governor valve mechanism 82.

When both passages 182 and 206 are pressurized, the servo 184 is released because of the influence of servo spring 208.

When fluid pressure is distributed from passage 200 to passage 206, it may flow through a bypass passage 210 that interconnects passage 200 with passage 206. A check valve 212 is situated in passage 210 to permit fluid flow toward the servo 184 and to inhibit fluid flow in a reverse direction. Bypass passage 214 is provided to accommodate fluid flow in a reverse direction. An orifice control valve 216 is situated in the bypass passage 214 and comprises a valve chamber 218 within which is disposed valve spool 220 having valve lands 222 and 224. Valve spool 220 normally is urged in a downward direction by valve spring 226.

Valve spool 220 includes also a valve land 228 that may be subjected to fluid pressure during a forced downshift, as subsequently will be explained, and during continued operation of the transmission mechanism with the manual valve moved to the low speed position indicated by the symbol "L."

When the orifice control valve spool 220 assumes the position shown in FIGURE 2b, fluid passing through passage 214 from the servo 184 is caused to pass through a fluid flow restriction 230 thereby retarding the rate of engagement of the low speed brake. Thus, when a downshift occurs while the vehicle is coasting, the rate of engagement of the low speed brake is gradual or cushioned. However, during a forced downshift valve spool 220 is moved in an upward direction under the influence of the pressure acting on the lower end thereof and the pressure passing from passage 206 to passage 214 is allowed to bypass the orifice 230. A bypass passage 232 is provided for this purpose. Thus, the rate of engagement of the low speed brake band during such a forced downshift is relatively high.

The rear pump described with reference to FIGURE 1 communicates with passage 164 through a rear pump supply passage 234. A rear pump check valve 236 is disposed in passage 234 as indicated. Thus, under certain high speed driving conditions, the pressure in passage 234 will be sufficient to open valve 236 and close the front pump check valve 166. The rear pump thus will supply the circuit pressure requirements of the mechanism. At this time the regulator valve spool 152 will be moved to the fully exhausted position so that the front pump will act against a pressure head of minimum value. During operation in the lower speed range, however, the front pump pressure exceeds the rear pump pressure and the check valve 166 will be open while check valve 236 will be closed. Under such conditions, the rear pump functions solely to supply the fluid pressure governor as will be explained subsequently.

Control pressure is distributed to a throttle valve supply passage 238 that in turn communicates with a throttle valve chamber 240. A throttle valve spool 242 is situated in passage 240 and is provided with lands 244 and 246. An engine vacuum operated servo, generally identified by reference character 248, includes a vacuum operated diaphragm 250 that is mechanically coupled to valve spool 242 through a valve rod 252. Servo 248 includes a valve spring 254 for normally biasing the valve 242 in an upward direction as viewed in FIGURE 2a. Servo 248 includes also a port 256 that can be connected to the engine intake manifold, the valve spool 242 thereby being actuated in response to changes in engine manifold pressure. The valve chamber 240 includes an exhaust port 258. The valve spool 242 includes a passage 260 that establishes communication between the upper end of the valve chamber 240 and the space defined by lands 244 and 246.

When the engine torque demand increases, pressure on the lower side of the diaphragm 250 will increase thus causing an increase in the degree of communication between passage 238 and throttle pressure passage 262 while simultaneously decreasing the degree of communication between passage 262 and port 258. The throttle pressure made available to passage 262 thus is an indicator of engine torque.

This throttle pressure is distributed to a throttle pressure boost valve chamber 264 within which is positioned a boost valve element 266 having spaced valve lands 268 and 270. The diameter of valve land 268 is greater than the diameter of valve land 270. A third valve land 272 is provided at the upper end of the valve spool 266. Communication is established between passage 262 and boost valve pressure passage 274 through the space between valve lands 272 and 264. This same pressure is distributed to the lower end of valve land 270. Valve spool 266 is biased normally in a downward direction by valve spring 276.

Line pressure is distributed to valve chamber 264 through a branch passage 278 that communicates with passage 234.

At relatively low engine throttle settings, the pressure that is made available to passage 274 is substantially equal to the throttle pressure in passage 262 and changes in engine torque demand thus are generally proportional to corresponding changes in the magnitude of the pressure in passage 274. The governor mechanism 82 includes a valve element 86 that is mounted within a valve chamber or bore 322. When the power output shaft rotates, communication between passage 234 and an exhaust port 324 is decreased by reason of the centrifugal force acting on valve element 86. A restriction 326 is situated between the governor and the passage 234. The magnitude of the governor pressure in passage 318 is determined by the degree of back pressure on the downstream side of the orifice 326. This back pressure in turn is influenced by the degree of communication between passage 318 and exhaust port 324. At higher speeds, valve element 86 tends to close off port 324 and the back pressure is correspondingly increased. Thus, the pressure in passage 318 is an indicator of the speed of the power output shaft.

Under certain operating conditions it is desirable to overrule the automatic action of the 1–2 shift valve. This is accomplished by forcing a downshift. Line pressure can be distributed during such a force downshift to the lower side of the valve land 196 and to the lower end of the valve land 194 through passage 328. The forces acting on the shift valve produced by the pressure in passage 328 thus overrule the action of the governor pressure force.

The automatic action of the shift valve can be overruled also by adjusting the manual valve to the "L" position. This causes communication to be established between passage 164 and passage 330, the latter communicating with an annular surface 331 located on the lower end of the valve part on which land 196 is formed. This same pressure is distributed to the lower end of valve land 228 of the orifice control valve and causes the orifice control valve to assume an upward position during operation in the low speed range. The release side of the low speed brake servo thus can be exhausted through passage 232 rather than the restriction 230 when the manual valve is moved to the low speed position while the vehicle is in motion. The front clutch, of course, is exhausted through passage 200 and exhaust port 202 under these conditions.

The valve mechanism for accomplishing a forced downshift is identified in FIGURE 2b and FIGURE 3 by reference character 332. This downshift valve includes a valve spool 334 having valve lands 336 and 338. Line pressure is distributed to downshift valve 332 through passage 340 that communicates with passage 188. Passage 328 normally is exhausted through downshift valve 332 and through an exhaust passage 342 that communicates with an exhaust port in the manual valve when the manual valve assumes the drive position "D."

When the vehicle engine throttle is moved to a wide open setting, valve spool 334 is moved in a right-hand direction as viewed in FIGURES 2b and 3 so that communication is established between passage 328 and passage 340 while simultaneously interrupting communication between passage 328 and passage 342. This causes passage 328 to become pressurized with line pressure thus forcing a downshift in the manner previously explained. The downshift valve is under the control of the vehicle operator, but a mechanical linkage between the driver operated throttle mechanism and the downshift control is not required. Also, a direct mechanical linkage between the throttle control and the transmission throttle valve is not required since the latter responds to engine vacuum pressure as previously explained.

The mechanism for initiating movement of the downshift valve is shown more particularly in FIGURES 4 and 5. In FIGURE 4, the vehicle accelerator or throttle pedal is indicated by reference character 344. It is pivoted at 346 to a bracket 348 that in turn is bolted by bolts 350 to the toe board or the sheet metal fire wall that forms a part of the vehicle passenger compartment. This fire wall is designated by reference character 352.

An accelerator pedal return spring can be provided as shown at 354.

A portion of the mechanical linkage mechanism for connecting the vehicle throttle with the accelerator pedal 344 is shown at 356. Movement of the accelerator pedal will cause an appropriate adjustment of the engine throttle.

The sheet metal 352 is indented as shown at 358 and a flexible diaphragm 360 is placed across the recess defined by the indentation 358. A servo cap 362 is bolted over the diaphragm 360 by means of bolts 364 thereby securing the diaphragm 360 in place. The cap 362 can be ported as shown at 366 so that the chamber defined by the diaphragm 360 and the cap 362 will be under atmospheric pressure. The chamber defined by the indentation 358 and the diaphragm 360 forms a part of a closed hydrostatic circuit, and for reference purposes it will be identified by numeral 368.

Cap 362 is formed with a tubular extension 370 within which is slidably received a plunger 372 that acts against a dished member 373 that forms a part of the diaphragm assembly together with the diaphragm 360.

A tubular adapter 374 is secured to the indentation 358 and communicates with the chamber 368 through a port 376. A portion of the transmission housing, such as the converter bell housing portion, is formed with an opening 378 within which is fitted a tubular adapter 380. A flexible tube 382 can be received over the adapter 380 and over the tubular extension 374. The end of the opening 378 communicates with the exterior of the transmission housing through a reduced diameter port 384. This port normally is closed by a valve element 386. Opening 378 communicates with a valve chamber 388 through a passage 390. This chamber 388 is defined in part by a flexible diaphragm 392 that is placed over a recess 394 formed in a housing portion 396, such as the main housing portion, the latter being bolted or otherwise secured to the housing portion within which opening 378 is formed. When the housing portion 396 is bolted in place, the periphery of the diaphragm 392 is held between the cooperating surfaces of the housing portions. A piston element 398 engages the diaphragm 392 and it is mechanically coupled to a downshift valve actuator rod 400 slidably received through an opening 402 in the housing portion 396. The downshift valve normally is biased in a left-hand direction by a valve spring 404 so that the rod 400 and the diaphragm 392 normally are urged in a left-hand direction as viewed in FIGURE 4.

When the vehicle accelerator pedal is depressed to a position corresponding to the wide open throttle setting, the hydrostatic pressure in chamber 368 is increased and this pressure is transmitted through the tubing 382 to the chamber 388, thus causing the rod 400 to be shifted in a right-hand direction.

If for any reason hydrostatic pressure is lost (e.g., through leakage) then valve element 386 will become unseated from its valve seat when the diaphragm 360 is returned to its original position. The air that was lost will be replaced in the closed circuit when pressure is relieved from the plunger 372. When the plunger 372 again is depressed, however, the valve 386 will again assume a closed position.

In order to provide a so-called detent feel, a detent spring element 406 can be secured to the inner wall of the cap 362. The end of the spring 406 can extend in a cantilever fashion within a groove 408 formed in plunger 372. When the throttle assumes a wide open position, the plunger 372 must be moved against the force of spring 406 before it will assume the downshift position. The operator thus can anticipate when a downshift will occur since a slight detent force can be felt just prior to initiation of a forced downshift.

In FIGURE 6 we have shown a modified form of the downshift valve actuator mechanism. It includes several portions that are common to the embodiment of FIGURES 1 through 5. These portions have been identified in FIGURE 6 by the same reference characters although primed notations have been used.

The actuator servo differs from the corresponding servo shown in FIGURE 4 and includes a compressible cup or bulb that may be made of rubber or some similar material. This bulb is identified generally by reference character 410. It defines an inner chamber 412 and has an opening adjacent the vehicle body sheet metal 352'. The margin 414 of the bulb 410 is secured to the sheet metal 352' by means of a clamping element 416 having a flanged head 418 that compresses the margin 414 against the sheet metal 352'. The element 416 is threaded and receives thereon a locking nut 420.

Element 416 includes also a tubular extension 422 having an opening therein that communicates with the chamber 412. The tubing 382' can be received over the end of the extension 422 to establish communication between the chamber 412 and the chamber 388 for the follower servo.

The tubing 382' and the previously described tubing 382 should be formed of a material that will impart flexibility to it.

One end of the bulb 410 is formed with an opening 424 that communicates with the atmosphere. This opening is closed by a closure member 426 carried by the accelerator pedal 344'. It may be formed of rubber or other suitable material and secured to the underside of the accelerator pedal in any known fashion.

When the accelerator pedal 344 is moved toward an advanced throttle position, member 426 engages the bulb 410 and compresses the same to decrease the volume of the chamber 412. At the same time, opening 424 is closed thus causing a sealed hydrostatic circuit that includes the actuator servo and the follower servo. The provision of such an opening 424 eliminates the need for providing a check valve of the type shown at 386 in FIGURE 4. Any fluid that may be lost through leakage during a downshift will be replaced when the operator relieves the accelerator pedal thus allowing pressure in chamber 412 to assume atmospheric pressure.

Having thus described certain preferred embodiments of our invention, what we claim and desire to secure by United States Letters Patent is:

In a multiple speed power transmission mechanism for a throttle controlled engine powered vehicle, said transmission mechanism including a housing having two portions with juxtaposed engageable surfaces, gear elements in said housing defining a plurality of torque delivery paths of different torque multiplication ratios, fluid pressure operated servos adapted to control the relative movement of said gear elements, a fluid pressure source, conduit structure interconnecting said pressure source and said servos, control valve means forming a part of said conduit structure for controlling automatically the operation of said servos in sequence during a speed ratio change, a pressure distributor valve means situated in said conduit structure for overruling the operation of said control valve means, a personally operable engine throttle control member, an actuator servo including a first movable wall defining in part a first pressure chamber, means for connecting said first movable wall to said engine throttle control member upon movement of the latter to a position corresponding to a substantially wide open engine throttle setting, a follower servo including a second movable wall defining in part another pressure chamber, said follower servo comprising a recess formed in one housing portion, said second movable wall comprising a flexible diaphragm extending over said recess, the margin of which is secured between said juxtaposed surfaces, a passage connecting said pressure chambers and defining therewith a closed hydrostatic circuit, a one-way check valve means communicating with said circuit for admitting air under atmospheric pressure to said circuit when a negative gauge pressure is established therein and for inhibiting loss of air from said circuit, means for mechanically connecting said second movable wall to a movable portion of said distributor valve means whereby a speed ratio change to a relatively low speed ratio can be accomplished independently of the operation of said control valve means, said engine throttle control member being pivotally mounted on a sheet metal wall, said sheet metal wall being formed with an indentation, said first movable wall comprising a flexible diaphragm extending over said indentation, said means for connecting said first movable wall to said throttle control member including an actuator engaging said diaphragm and adapted to be engaged by said throttle control member, said actuator having an arcuate surface of a curvature mating with the curvature of said indentation to conform said diaphragm to said indentation, and means for clamping the margin of said diaphragm on said sheet metal wall to form said first pressure chamber.

References Cited in the file of this patent

UNITED STATES PATENTS

| | | |
|---|---|---|
| 1,459,317 | Birdsall | June 19, 1923 |
| 1,877,502 | Flocco | Sept. 13, 1932 |
| 2,164,475 | Schjolin | July 4, 1939 |
| 2,775,401 | Storrs | Dec. 25, 1956 |
| 2,938,403 | Harrison et al. | May 31, 1960 |
| 3,004,446 | Flinn | Oct. 17, 1961 |